(12) United States Patent
Marti-Arbona et al.

(10) Patent No.: US 9,249,023 B2
(45) Date of Patent: Feb. 2, 2016

(54) LIQUID CRYSTALS FROM SINGLE-WALLED CARBON NANOTUBE POLYELECTROLYTES AND THEIR USE FOR MAKING VARIOUS MATERIALS

(71) Applicants: Angel A. Marti-Arbona, Houston, TX (US); Chengmin Jiang, Houston, TX (US); Avishek Saha, Houston, TX (US); Matteo Pasquali, Houston, TX (US); Colin Young, Houston, TX (US)

(72) Inventors: Angel A. Marti-Arbona, Houston, TX (US); Chengmin Jiang, Houston, TX (US); Avishek Saha, Houston, TX (US); Matteo Pasquali, Houston, TX (US); Colin Young, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 0 days.

(21) Appl. No.: 14/199,418

(22) Filed: Mar. 6, 2014

(65) Prior Publication Data

US 2014/0255291 A1    Sep. 11, 2014

Related U.S. Application Data

(60) Provisional application No. 61/773,371, filed on Mar. 6, 2013.

(51) Int. Cl.
*C01B 31/02* (2006.01)
*D01D 5/06* (2006.01)
(Continued)

(52) U.S. Cl.
CPC ......... *C01B 31/0273* (2013.01); *C01B 31/0253* (2013.01); *C08K 7/24* (2013.01); *D01D 5/06* (2013.01); *D01F 9/12* (2013.01); *C01B 2202/02* (2013.01); *C01B 2202/08* (2013.01); *C08K 2201/011* (2013.01)

(58) Field of Classification Search
CPC ............ C01B 2202/02; C01B 2202/08; C01B 31/022; C01B 31/0253; D01F 9/12; C08K 7/24; C08K 2201/011
USPC ................................ 423/447.1; 977/742, 788
See application file for complete search history.

(56) References Cited

U.S. PATENT DOCUMENTS 7,125,502 B2    10/2006   Smalley et al.
7,288,238 B2    10/2007   Smalley et al.
(Continued)

OTHER PUBLICATIONS

Anderson, Robin E., and Andrew R. Barron. "Solubilization of single-wall carbon nanotubes in organic solvents without sidewall functionalization." Journal of nanoscience and nanotechnology 7.10 (2007): 3436-3440.*

(Continued)

*Primary Examiner* — Richard M Rump
(74) *Attorney, Agent, or Firm* — Winstead PC

(57) ABSTRACT

In some embodiments, the present disclosure pertains to methods of forming a solution of single-walled carbon nanotube polyelectrolytes in a liquid crystalline phase. In some embodiments, such methods comprise: (a) providing single-walled carbon nanotube polyelectrolytes; and (b) mixing the single-walled polyelectrolytes with a polar aprotic solvent to form a mixture, where the mixing results in the formation of single-walled carbon nanotubes in the liquid crystalline phase. In some embodiments, the polar aprotic solvent comprises crown ether. In some embodiments, the present disclosure pertains to a method of making single-walled carbon nanotube fibers. Further embodiments of the present disclosure pertain to a method of making a single walled carbon nanotube composite. In some embodiments, the present disclosure pertains to an article comprising neat aligned carbon nanotubes.

45 Claims, 9 Drawing Sheets

(51) Int. Cl.
    D01F 9/12      (2006.01)
    C08K 7/24      (2006.01)

(56) References Cited

U.S. PATENT DOCUMENTS

2011/0110843 A1* 5/2011 Pasquali et al. ............ 423/447.2
2011/0262772 A1  10/2011 Hauge et al.

OTHER PUBLICATIONS

Murakami, Hiroto, and Naotoshi Nakashima. "Soluble carbon nanotubes and their applications." Journal of nanoscience and nanotechnology 6.1 (2006): 16-27.*
Ericson et al., Macroscopic Neat Single-Walled Carbon Nanotubes Fibers, Science 2004, 305, 1447.
Giordani et al., Debundling of Single-Walled Nanotubes by Dilution:? Observation of Large Populations of Individual Nanotubes in Amide Solvent Dispersions, J. Phys. Chem. B 2006, 110, 15708.
Zheng et al., Structure-Based Carbon Nanotube Sorting by Sequence-Dependent DNA Assembly, Science 2003, 302, 1545.
Pénicaud et al., Spontaneous Dissolution of a Single-Wall Carbon Nanotube Salt, J. Am. Chem. Soc. 2005, 127, 8.
Voiry et al., Stoichiometric control of single walled carbon nanotubes functionalization, J. Mater. Chem. 2010, 20, 4385.
Voiry et al., Portrait of carbon nanotube salts as soluble polyelectrolytes, Soft Matter 2011, 7, 7998.
Hodge et al., Electrochemical processing of discrete single-walled carbon nanotube anions, ACS Nano 2013, 7, 1769.
Liang et al., A Convenient Route to Functionalized Carbon Nanotubes, Nano Lett. 2004, 4, 1257.
Chattopadhyay et al., Carbon Nanotube Salts. Arylation of Single-Wall Carbon Nanotubes, Org. Lett. 2005, 7, 4067.
Behabtu et al., Carbon nanotube-based neat fibers, Nano Today 2008, 3, 24.
Pénicaud et al., Mild dissolution of carbon nanotubes: Composite carbon nanotube fibres from polyelectrolyte solutions, Compos. Sci. Technol. 2007, 67, 795.
Vigolo et al., Macroscopic Fibers and Ribbons of Oriented Carbon Nanotubes, Science 2000, 290, 1331.
Anderson et al., Solubilization of single-wall carbon nanotubes in Organic solvents without sidewall functionalization, Nanosci. Nanotechnol. 2007, 7, 3436.
Barisci et al., Properties of Carbon Nanotube Fibers Spun from DNA-Stabilized Dispersions, Adv. Funct. Mater. 2004, 14, 133.
Jiang et al., Increased Solubility, Liquid-Crystalline Phase, and Selective Functionalization of Single-Walled Carbon Nanotube Polyelectrolyte Dispersions, ACS Nano 2013, 7, 4503.
Steinmetz et al., Production of pure nanotube fibers using a modified wet-spinning method, Carbon 2005, 43, 2397.
Zhao et al., Printed thin-film transistors with functionalized single-walled carbon nanotube inks, J. Mater. Chem. 2012, 22, 2051.
Jo et al., Fabrication of Highly Conductive and Transparent Thin Films from Single-Walled Carbon Nanotubes Using a New Non-ionic Surfactant via Spin Coating, ACS Nano 2010, 4, 5382.
Liu et al., Additive-Free Dispersion of Single-Walled Carbon Nanotubes and Its Application for Transparent Conductive Films, Adv. Funct. Mater. 2011, 21, 2330.
Saha et al., Films of bare single-walled carbon nanotubes from superacids with tailored electronic and photoluminescence properties, ACS Nano 2012, 6, 5727.
Mirri et al., High-Performance Carbon Nanotube Transparent Conductive Films by Scalable Dip Coating, ACS Nano 2012, 6, 9737.
Holt et al., Prolonging Charge Separation in P3HT-SWNT Composites Using Highly Enriched Semiconducting Nanotubes, Nano Lett. 2010, 10, 4627.
Ren et al., Toward efficient carbon nanotube/P3HT solar cells: active layer morphology, electrical, and optical properties, Nano Lett. 2011, 11, 5316.

Gebhardt et al., Selective Polycarboxylation of Semiconducting Single-Walled Carbon Nanotubes by Reductive Sidewall Functionalization, J. Am. Chem. Soc. 2011, 133, 19459.
Tuncel, D. Non-covalent interactions between carbon nanotubes and conjugated polymers, Nanoscale 2011, 3, 3545.
Jain et al., Non-covalent ruthenium polypyridyl complexes-carbon nanotubes composites: an alternative for functional dissolution of carbon nanotubes in solution, Chem. Commun. 2011, 47, 2246.
Saha et al., Single-walled carbon nanotubes shell decorating porous silicate materials: A general platform for studying the interaction of carbon nanotubes with photoactive molecules, Chem. Sci. 2011, 2, 1682.
Petit et al., Tuning and monitoring the electronic structure of carbon nanotubes, Chem. Phys. Lett. 1999, 305, 370.
Ko et al., Liquid-Crystalline Processing of Highly Oriented Carbon Nanotube Arrays for Thin-Film Transistors, Nano Lett. 2006, 6, 1443.
Zhang et al., Carbon Nanotubes as Liquid Crystals, Small 2008, 4, 1270.
Pedersen et al., Crystalline Salt Complexes of Macrocyclic Polyethers, J. Am. Chem. Soc. 1970, 92, 386.
Pedersen et al., Macrocyclic polyethers and their complexes, Angew. Chem. Int. Ed. 1972, 11, 16.
Wunderlich et al., Preferred functionalization of metallic and small-diameter single walled carbon nanotubes via reductive alkylation, J. Mater. Chem. 2008, 18, 1493.
Guan et al., The nanofabrication of polydimethylsiloxane using a focused ion beam, Nanotechnology 2009, 20, 145301.
Araujo et al., Resonance Raman spectroscopy of the radial breathing modes in carbon nanotubes, Physica E 2010, 42, 1251.
Müller et al., Diameter dependence of addition reactions to carbon nanotubes, Phys. Status Solidi B 2008, 245, 1957.
Hodge et al., Unweaving the rainbow: a review of the relationship between single-walled carbon nanotube molecular structures and their chemical reactivity, Chem. Soc. Rev. 2012, 41, 4409.
O'Connell et al., Near-infrared resonance Raman excitation profile studies of single-walled carbon nanotube intertube interactions: A direct comparison of bundled and individually dispersed HiPco nanotubes, Phys. Rev. B: Condens. Matter 2004, 69, 235415.
Luo et al., Effects of aggregation and electron-phonon interactions on RBM spectral reconstruction of single walled carbon nanotubes, Phys. Status Solidi B 2006, 243, 3155.
Davis et al., True solutions of single-walled carbon nanotubes for assembly into macroscopic materials. Nat. Nanotechnol. 2009, 4, 830.
Ramesh et al., Dissolution of Pristine Single Walled Carbon Nanotubes in Superacids by Direct Protonation, J. Phys. Chem. B 2004, 108, 8794.
Rai et al., Isotropic-Nematic Phase Transition of Single-Walled Carbon Nanotubes in Strong Acids, J. Am. Chem. Soc. 2005, 128, 591.
Parra-Vasquez et al., Spontaneous Dissolution of Ultralong Single-andMultiwalled Carbon Nanotubes, ACS Nano 2010, 4, 3969.
Ausman et al., Organic Solvent Dispersions of Single-Walled Carbon Nanotubes:? Toward Solutions of Pristine Nanotubes, J. Phys. Chem. B 2000, 104, 8911.
Bahr et al., Dissolution of small diameter single-wall carbon nanotubes in organic solvents?, Chem. Commun. 2001, 193.
Moore et al., Individually Suspended Single-Walled Carbon Nanotubes in Various Surfactants, Nano Lett. 2003, 3, 1379.
O'Connell et al., Band Gap Fluorescence from Individual Single-Walled Carbon Nanotubes, Science 2002, 297, 593.
Kam et al., Functionalization of carbon nanotubes via cleavable disulfide bonds for efficient intracellular delivery of siRNA and potent gene silencing, J. Am. Chem. Soc. 2005, 127, 12492.
Fogden et al., Scalable Method for the Reductive Dissolution, Purification, and Separation of Single-Walled Carbon Nanotubes, ACS Nano 2011, 6, 54.
Gebhardt et al., Carbon Nanotube Sidewall Functionalization with Carbonyl Compounds-Modified Birch Conditions vs the Organometallic Reduction Approach, J. Am. Chem. Soc. 2011, 133, 7985.
Kozlov et al., Spinning Solid and Hollow Polymer-Free Carbon Nanotube Fibers, Adv. Mater. 2005, 17, 614.

(56) References Cited

OTHER PUBLICATIONS

Behabtu et al., Strong, Light, Multifunctional Fibers of Carbon Nanotubes with Ultrahigh Conductivity, *Science* 2013, 339, 182.

Wang, et al. Extremely Bendable, High-Performance Integrated Circuits Using Semiconducting Carbon Nanotube Networks for Digital, Analog, and Radio-Frequency Applications, *Nano Lett.* 2012, 12, 1527.

Chen et al., Soluble Ultra-Short Single-Walled Carbon Nanotubes, *J. Am. Chem. Soc.* 2006, 128, 10568.

Strano et al., Electronic Structure Control of Single-Walled Carbon Nanotube Functionalization, *Science* 2003, 301, 1519.

Davis et al., Phase Behavior and Rheology of SWNTs in Superacids, *Macromolecules* 2003, 37, 154.

Pekker et al., Hydrogenation of Carbon Nanotubes and Graphite in Liquid Ammonia, *J. Phys. Chem. B* 2001, 105, 7938.

Bachilo et al., Structure-Assigned Optical Spectra of Single-Walled Carbon Nanotubes, *Science* 2002, 298, 2361.

Heller et al., Using Raman Spectroscopy to Elucidate the Aggregation State of Single-Walled Carbon Nanotubes, *J. Phys. Chem. B* 2004, 108, 6905.

Weisman et al., Dependence of Optical Transition Energies on Structure for Single-Walled Carbon Nanotubes in Aqueous Suspension: An Empirical Kataura Plot, *Nano Lett.* 2003, 3, 1235.

Chiang et al., Purification and Characterization of Single-Wall Carbon Nanotubes (SWNTs) Obtained from the Gas-Phase Decomposition of CO (HiPco Process), *J. Phys. Chem. B* 2001, 105, 8297.

\* cited by examiner

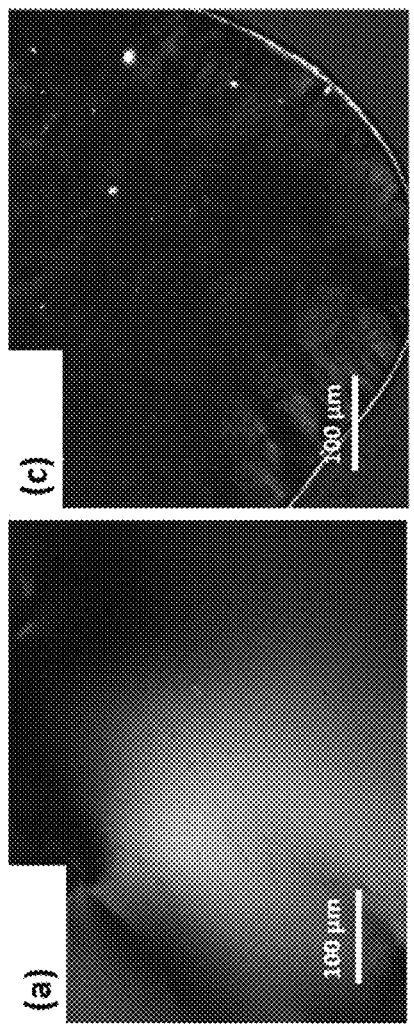
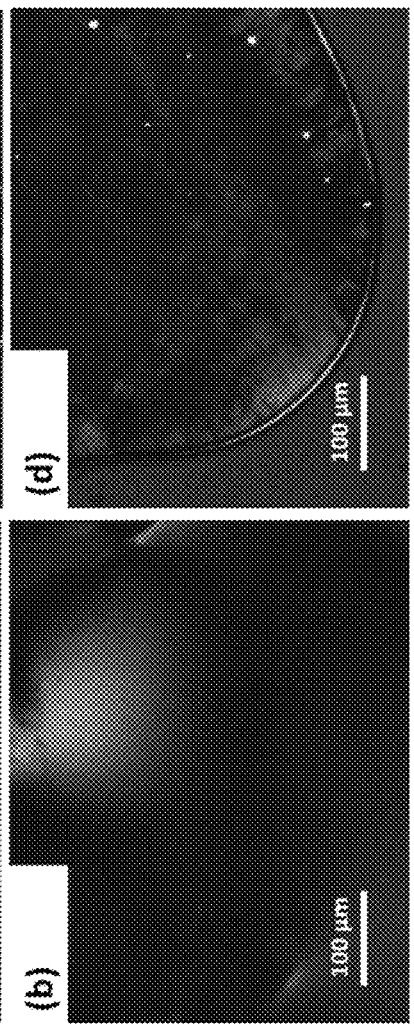
Fig. 4A  Fig. 4B  Fig. 4C  Fig. 4D

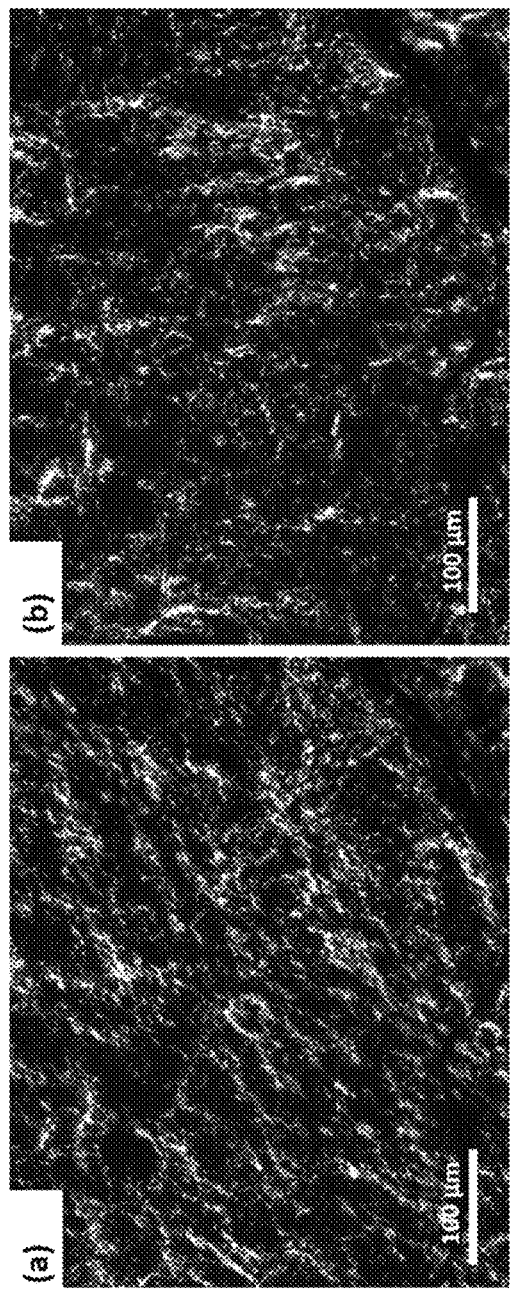

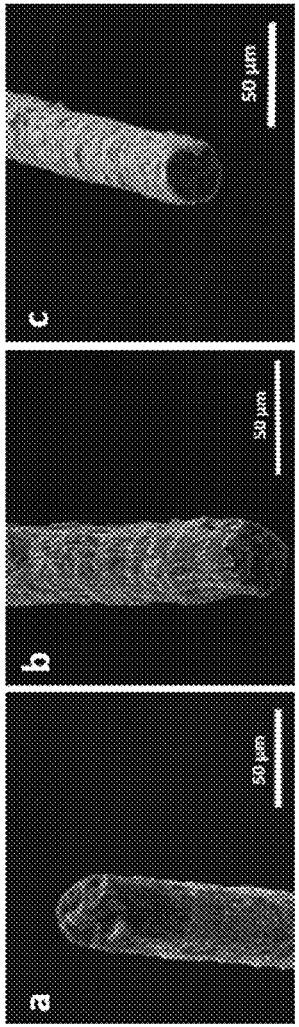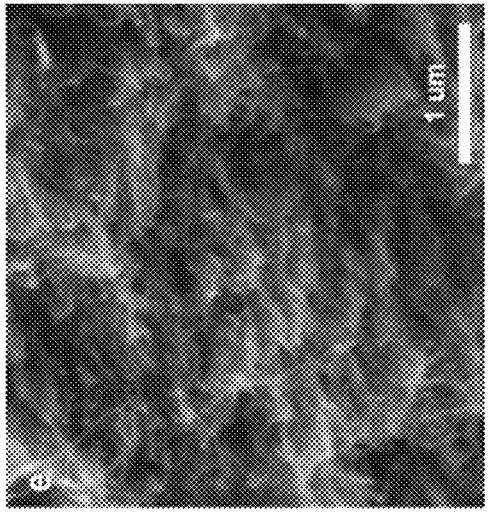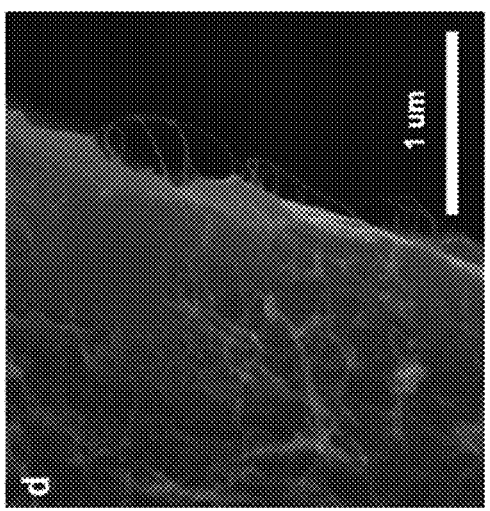

LIQUID CRYSTALS FROM SINGLE-WALLED CARBON NANOTUBE POLYELECTROLYTES AND THEIR USE FOR MAKING VARIOUS MATERIALS

CROSS REFERENCE TO RELATED APPLICATIONS

This application claims priority to U.S. Provisional Patent Application No. 61/773,371, filed on Mar. 6, 2013. The entirety of the aforementioned application is incorporated herein by reference.

BACKGROUND OF THE INVENTION

The assembly of single-walled carbon nanotube (SWCNT) dispersions into strong macroscopic materials by either spinning or coagulation requires disentanglement, individualization and partial alignment of the single-walled carbon nanotubes. A methodology for dispersing single-walled carbon nanotubes is by forming carbon nanotube polyelectrolytes. The formation of a liquid crystalline single-walled carbon nanotube phase is preferred in order to manufacture single-walled carbon nanotube polyelectrolytes into ordered macroscopic materials. However, the formation of liquid crystalline phases from single-walled carbon nanotube polyelectrolytes has been prevented due to the limited solubility and therefore inability to reach concentrations high enough to form the liquid crystalline phase. Consequently, more effective methods are needed for forming SWCNT polyelectrolytes liquid crystals.

BRIEF SUMMARY OF THE INVENTION

In some embodiments, the present disclosure pertains to methods of forming a solution of single-walled carbon nanotube polyelectrolytes in a liquid crystalline phase. In some embodiments, such methods comprise: (a) providing single-walled carbon nanotube polyelectrolytes; and (b) mixing the single-walled polyelectrolytes with a polar aprotic solvent to form a mixture, where the mixing results in the formation of single-walled carbon nanotubes in the liquid crystalline phase. In some embodiments, the polar aprotic solvent comprises crown ether. In some embodiments, the mixing occurs at 2,500 rpm. In some embodiments, the concentration of the single walled carbon nanotube polyelectrolyte in the liquid crystalline phase is up to about 52 mg/ml.

In some embodiments, the step of providing the single-walled carbon nanotube polyelectrolytes used in accordance with the methods of the present disclosure comprises: (a) contacting single-walled carbon nanotubes with a solution comprising: (i) an alkali metal; (ii) at least one polyaromatic compound; and an aprotic solvent. In some embodiments, the step further comprises stirring the resultant solution and filtering the solution to obtain the single-walled carbon nanotube polyelectrolytes. In some embodiments, the step yet further comprises rinsing the single-walled carbon nanotube polyelectrolytes with the solvent and drying the single walled carbon nanotube polyelectrolytes.

In some embodiments, the present disclosure pertains to a method of making single-walled carbon nanotube fibers. In an embodiment, such a method comprises (FIG. 1): (a) providing single-walled carbon nanotube polyelectrolytes; (b) mixing the single-walled carbon nanotube polyelectrolytes with a polar aprotic solvent to form a mixture; where the mixing results in formation of single-walled carbon nanotubes in liquid crystalline phase; and (c) coagulating the mixture to form the single-walled carbon nanotube fibers. In some embodiments the polar aprotic solvent comprises crown ether. In some embodiments, the coagulating comprises extruding the mixture. In some embodiments, the coagulating comprises extruding the mixture into a coagulation solution.

Further embodiments of the present disclosure pertain to a method of making a single walled carbon nanotube composite. In some embodiments, the method comprises providing single-walled carbon nanotube polyelectrolytes; mixing the single-walled carbon nanotube polyelectrolytes with a polar aprotic solvent to form a mixture, where the mixing results in formation of single-walled carbon nanotube polyelectrolytes in liquid crystalline phase; and dispersing the mixture onto a surface to form the single-walled carbon nanotube composites. In some embodiments, the polar aprotic solvent comprises crown ether. In some embodiments, the single-walled carbon nanotube composite is in the form of a film. In some embodiments, the method further comprises mixing the single-walled carbon nanotube polyelectrolytes in liquid crystalline phase with a polymer precursor (e.g., a monomer).

In some embodiments, the present disclosure pertains to an article comprising neat aligned carbon nanotubes. In some embodiments, the article is produced by a process comprising: (a) providing single-walled carbon nanotube polyelectrolytes; (b) mixing the single-walled carbon nanotube polyelectrolytes with a polar aprotic solvent to form a mixture, where the mixing results in formation of single-walled carbon nanotubes in liquid crystalline phase; and (c) dispersing the mixture onto a surface to form the article. In some embodiments, the polar aprotic solvent comprises crown ether.

BRIEF DESCRIPTION OF THE FIGURES

FIGS. 4A-4D show polarized optical image of a 3.8 mg/mL HiPco SWCNT polyelectrolytes solution imaged under cross-polarizers (FIG. 4A) and with stage rotated 45° (FIG. 4B) Polarized optical image of 4.4 mg/mL HiPco SWCNT polyelectrolytes with 20 mg/mL crown ether imaged under cross-polarizers (FIG. 4C) and with the stage rotated 45° (FIG. 4D). The round edges are the edges of a solution droplet.

FIGS. 7A-7B show cross-polarized optical microscopy images of 35 mg/mL HiPco SWCNT polyelectrolytes dispersions in DMSO with crown ether (FIG. 7A) and with the cross-polarizers rotated by 45° (FIG. 7B).

FIGS. 8A-8E show Scanning Electron Microscope (SEM) images of fibers produced from 35 mg/mL SWCNT dispersion. SEM image of fiber spun into water (FIG. 8A), fiber spun into from 0.1 M HCl solution (FIG. 8B), fiber spun into 0.001 M $NaI_3$ solution (FIG. 8C), enlarged sidewall view of a fiber (FIG. 8D) and enlarged cross-section of a fiber (FIG. 8E).

DETAILED DESCRIPTION

Figure 1:
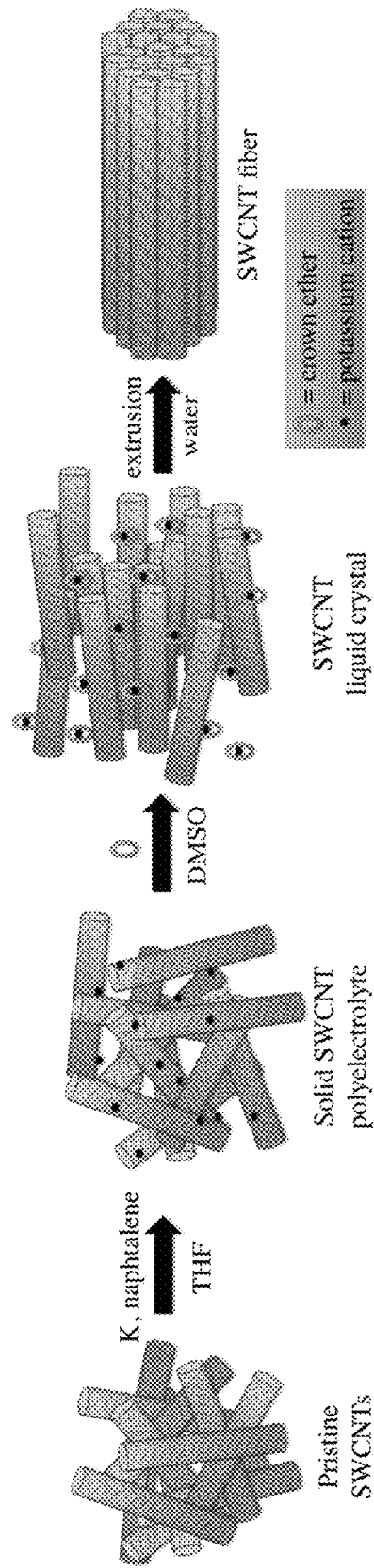
FIG. 1 is a pictorial representation of the reduction reaction to form the SWCNT polyelectrolyte, crown-ether-assisted dissolution of SWCNT polyelectrolyte, liquid crystalline phase formation and fiber manufacture.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Single-walled carbon nanotubes (SWCNTs) exemplify the ultimate building block for the construction of novel devices due to their unique combination of properties. Processing as-synthesized SWCNTs into practical materials requires their dispersion in solvents, which has been previously accomplished by dissolution in acids, solvents, surfactants and biopolymers. A preferred way to disperse SWCNTs is by forming SWCNT polyelectrolytes, where nanotubes are negatively charged by reduction of their walls by alkali metals. When a polar aprotic solvent is added, the Columbic repulsions between the negatively charged side walls of the nanotubes promote their individualization and dissolution. SWCNT polyelectrolytes may be synthesized by metallic lithium reduction. Other alkali metals may also be employed. SWCNT salts $[A(THF)]_n$CNT (A=Li, Na, K) are known to spontaneously dissolve in a series of aprotic organic solvents, such as DMSO and sulfolane.

SWCNT polyelectrolyte liquid crystal dispersions for the production of ordered macroscopic materials are particularly attractive due to the convenient chemical properties of SWCNT polyelectrolytes. For example, alkyl bromides are known to readily react with SWCNT polyelectrolytes to form alkyl-functionalized carbon nanotubes. Negatively charged SWCNTs dissolve spontaneously in a series of aprotic organic solvents, such as DMF, DMSO and sulfolane, and bear potential to serve as an intermediate for covalent functionalization. However, the application of SWCNT polyelectrolytes to manufacture macroscopic materials such as neat SWCNT fibers has not been explored in a substantial manner.

A desirable factor in the manufacture of ordered macroscopic materials is the formation of a liquid crystalline phase. However, this has never been reported for SWCNT polyelectrolytes. The reason for this is likely related to the limited solubility of SWCNT polyelectrolyte dispersions utilizing previous methods. Previous methods limited the solubility of HiPco SWCNT polyelectrolytes to 0.4 mg/mL, and to 4-5 mg/mL for electric arc SWCNT polyelectrolytes. The limited solubility of these SWCNT polyelectrolytes has been proposed to involve the condensation of alkali metal counterions on the surface of negatively charged SWCNTs, which shield the repulsion between negative charges that is responsible for SWCNTs dispersion. Therefore, weaker repulsive interactions between SWCNTs result in carbon nanotubes not being able to overcome the attractive van der Waals interactions and attain dispersion. Presently, overcoming the aforementioned challenges is an important goal of carbon nanotechnology. Thus, the present disclosure aims to address these challenges.

In some embodiments, the present disclosure utilizes crown ethers to capture the counterions and prevent their condensation onto the SWCNTs walls, increasing solubility in DMSO to 9.4 mg/mL. Further, with the use of crown ethers and speed mixing, Applicants were able to obtain SWCNT polyelectrolyte dispersions up to 52 mg/mL. The solutions thus obtained are viscous, present liquid crystalline behavior, and can be spun into a coagulating solvent forming fibers that present superior tensile strength and Young Modulus. The disclosure herein provides the first examples of neat SWCNT fibers manufactured from SWCNT polyelectrolyte solutions, without the aid of any polymers or additives in some embodiments.

In some embodiments, the present disclosure pertains to methods of forming a solution of single-walled carbon nanotubes in a liquid crystalline phase. In some embodiments, the method comprises: (a) providing single-walled carbon nanotube polyelectrolytes; and (b) mixing the single-walled carbon nanotube polyelectrolytes with a polar aprotic solvent to form a mixture, where the polar aprotic solvent comprises crown ether, and where the method results in formation of single-walled carbon nanotubes in the liquid crystalline phase.

Various polar aprotic solvents may be compatible for use with the methods of the present disclosure. For instance, in some embodiments, the polar aprotic solvent may be Dimethyl Sulfoxide (DMSO). In another embodiment, the polar aprotic solvent may be Sulfolane. In yet, another embodiment, the polar aprotic solvent may be Dimethylformamide (DMF).

Various crown ethers may be compatible for use with the methods of the present disclosure. Depending on the alkali metal or the solvent to be used different crown ethers may be employed. For instance, in some embodiments, the crown ether used may be 18-crown-6.

In some embodiments, the step of mixing occurs at high speeds. For instance, in an embodiment, the mixing occurs at around 2500 rpm. Without being bound by theory, Applicants envision that the combination of using crown ethers and speed mixing helps attain the liquid crystalline phase in which the concentration of the SWCNT polyelectrolyte dispersion is up to about 52 mg/ml (SWCNT initial concentration of 60 mg/mL). Higher concentrations might be attained with higher initial concentrations.

In some embodiments, the step of providing the single-walled carbon nanotube polyelectrolytes used in accordance with the methods of the present disclosure comprises: (a)

contacting the single-walled carbon nanotubes with a solution comprising: (i) an alkali metal; (ii) at least one polyaromatic compound; and an aprotic solvent. In some embodiments, the step further comprises stirring the resultant solution and filtering the solution to obtain the single-walled carbon nanotube polyelectrolytes. In some embodiments, the step yet further comprises rinsing the single-walled carbon nanotube polyelectrolytes with the solvent and drying the single walled carbon nanotube polyelectrolytes.

Various alkali and alkaline metals may be compatible for use with the methods of the present disclosure. In some embodiments, the alkali metal of the present disclosure may be selected from the group consisting of potassium, lithium, sodium, and other alkali and alkaline metals, and combinations thereof.

Various polyaromatic compounds may be compatible with the methods disclosed herein. For instance, in some embodiments, the polyaromatic compound is selected from the group consisting of naphthalene, anthracene, phenanthracene, pyrene, tetracene, tetraphene, chrysene, triphenylene, pentacene, pentaphene, perylene, benzo[a]pyrene, coronene, antanthrene, corannulene, ovalene, graphene, fullerene, cycloparaphenylene, polyparaphenylene, cyclophene, and combinations thereof.

In some embodiments, suitable aprotic solvent for the methods of the present disclosure include, without limitation, tetrahydrofuran, dimethoxyelthane, and combinations thereof.

In some embodiments the present disclosure pertains to a method of making single-walled carbon nanotube fibers. In some embodiments, such a method comprises: (a) providing single-walled carbon nanotube polyelectrolytes; (b) mixing the single-walled carbon nanotube polyelectrolytes with a polar aprotic solvent to form a mixture, where the polar aprotic solvent comprises a crown ether, and where the mixing results in formation of single-walled carbon nanotubes in liquid crystalline phase; and (c) coagulating the mixture to form the single-walled carbon nanotube fibers.

Various methods may be used to coagulate the mixture. For instance, in some embodiments, the coagulant comprises extruding the mixture into a coagulation solution. In some embodiments, the coagulation solution is capable of accepting the electrons. In some embodiments, the coagulating solution may be selected from the group consisting of water, aqueous hydrochloric acid, iodide solutions, and combinations thereof.

Without being bound by theory, Applicants envision that the single walled carbon nanotube fibers made by the methods disclosed herein present convenient tensile strength and Young Modulus. In some embodiments, the single-walled carbon nanotube fibers have a tensile strength of about 124 Mpa, and a Young's modulus of about 14 Gpa. In some embodiment, the single walled carbon nanotube fibers made by the methods disclosed herein, have a diameter ranging from about 20 μM to about 35 μM.

Further embodiments of the present disclosure pertain to a method of making a single walled carbon nanotube composite. In some embodiments, the method comprises providing single-walled carbon nanotube polyelectrolytes; mixing the single-walled carbon nanotube polyelectrolytes with a polar aprotic solvent to form a mixture, where the mixing results in formation of single-walled carbon nanotube polyelectrolytes in liquid crystalline phase; and dispersing the mixture onto a surface to form the single-walled carbon nanotube composites. In some embodiments, the polar aprotic solvent comprises crown ether. In some embodiments, the single-walled carbon nanotube composite is in the form of a film. In some embodiments, the method further comprises mixing the single-walled carbon nanotube polyelectrolytes in liquid crystalline phase with a polymer monomer.

In some embodiments, the SWNCT polyelectrolyte solutions may be mixed with polymer precursors to form composite materials. In some embodiments, suitable polymer precursors include monomers. In some embodiments, the monomers include, without limitation, ethyl acrylate, methyl metacrylate, acrylonitrile, and N-vinylpyrrolidone. In some embodiments, the polymer precursors may be polymerized after mixing. In some embodiments, the SWNCT polyelectrolyte solutions may be mixed with polymers to form composite materials. In some embodiments, the polymers may include, without limitation, polyvinyl alcohol, polyethylene glycol, and polyacrylonitrile. Without being bound by theory, Applicants envision that such composite materials would have improved mechanical and electrical properties.

The methods of the present disclosure can also occur in various environments. For instance, in some embodiments, the SWCNT solutions may be highly sensitive to environmental oxygen. Therefore the solutions need to be handled in a glove box under a blanket of inert gas.

In some embodiments, the present disclosure pertains to an article comprising neat aligned carbon nanotubes. In some embodiments, the article is produced by a process comprising: (a) providing single-walled carbon nanotube polyelectrolytes; (b) mixing the single-walled carbon nanotube polyelectrolytes with a polar aprotic solvent to form a mixture, where the mixing results in formation of single-walled carbon nanotubes in liquid crystalline phase; and (c) dispersing the mixture onto a surface to form the article. In some embodiments, the polar aprotic solvent comprises crown ether.

In some embodiments, the methods of the present disclosure may also include a step of doping the carbon material with a dopant. The carbon materials of the present disclosure may be doped with various dopants. For instance, in some embodiments, the dopant may include at least one of iodine, chlorine, bromine, antimony, phosphorous, boron, aluminum, gallium, selenium, tellurium, silicon, germanium, magnesium, zinc, cadmium, lithium, sodium, potassium, beryllium, magnesium, calcium, alkaline earth metals, and combinations thereof. In some embodiments, the dopant includes iodine.

In some embodiments, the methods of the present disclosure may be performed without the use of any additives. For instance, in some embodiments, the methods of the present disclosure may occur without the use of polymers. In some embodiments, the methods of the present disclosure may occur without the use of surfactants.

In some embodiments of the present disclosure, the solubility of SWCNT polyelectrolytes may be dependent on the initial amount of carbon nanotubes used. In some embodiments of the present disclosure, the concentration of SWCNT polyelectrolytes in DMSO may be effectively increased by using crown ether. In some embodiments, the crown ether may be the potassium cation sequester 18-crown-6. In some embodiments, concentrations as high as up to about 52 mg/mL of SWCNTs polyelectrolyte may be achieved.

UV-Vis spectroscopy was used to obtain the concentration of SWCNTs polyelectrolytes in DMSO, which has proven to be a convenient and fast method to assess dispersion concentrations. In addition, cross-polarization microscopy was employed to confirm the formation of liquid crystal phases at concentrations higher that 3.8 mg/mL of SWCNT polyelectrolytes in DMSO. Finally, in an embodiment of the present disclosure, preferential functionalization of small diameter SWCNT was observed when dispersed with DMSO, which can be evaluated by changes in the intensity of the peaks in the Raman RBM region and the photoluminescence spectra.

Applications and Advantages

Various embodiments of the present disclosure can allow for an alternative way of making fibers and other composite materials. For instance, the use of crown ethers to increase the solubility of SWCNT polyelectrolytes allows for highly concentrated SWCNT polyelectrolyte solutions. Such solutions can be processed into carbon anotube fibers and films that have important application in material fabrication and reinforcement. Applications such as bullet proof vests, ultra hard plastic composites, conductive surfaces, touch screen displays, and light emitting diodes are just a few examples of the potential applications that can be impacted by the embodiments of the present disclosure.

Additionally, compared with other established solution-based methods for fiber manufacture, the methods of the present disclosure are highly advantageous. Previously reported, surfactant-based method produces SWCNT fibers with inferior properties in comparison with others methodologies. This may be attributed to shortening of the nanotubes by the necessary ultrasonication step required by this method. For the acid-based spinning method, SWCNTs are dispersed in strong acids like fuming sulfuric acid or chlorosulfonic acid, which require careful handling, and acid-resistant processing equipment. The methods disclosed herein involve generating SWCNT fibers under milder conditions, yet resulting in mechanical and electrical properties comparable to the best results obtained by other methods with HiPco SWCNTs. Moreover, the reagents used for this procedure are common and the methodology straightforward.

The aforementioned embodiment will be discussed in more detail below. Various aspects of the methods and systems of the present disclosure will also be discussed with more elaboration below as specific and non-limiting examples.

Additional Embodiments

From the above disclosure, a person of ordinary skill in the art will recognize that the methods and systems of the present disclosure can have numerous additional embodiments. Reference will now be made to more specific embodiments of the present disclosure and experimental results that provide support for such embodiments. However, Applicants note that the disclosure below is for exemplary purposes only and is not intended to limit the scope of the claimed invention in any way.

EXAMPLES

Additional details about the experimental aspects of the above-described studies are discussed in the subsections below.

Example 1

Materials

The HiPco SWCNTs (Product code: 195.1) utilized were obtained from Rice University and purified as previous reported in the scientific literature. Potassium metal and dimethyl sulfoxide (DMSO) were obtained from Sigma Aldrich. Naphthalene was bought from Alfa Aesar. All of the reagents above were used as received. 18-crown-6 was purchased from Acros and purified by recrystallization in dry acetonitrile. Tetrahydrofuran (THF) was freshly distilled over Na/benzophenone.

Example 2

General Procedure for the Preparation of SWCNT Polyelectrolytes

SWCNT polyelectrolytes were produced following a modified method from literature. In a typical synthesis, 69.6 mg potassium metal (1.78 mmol), 163.2 mg naphthalene (1.27 mmol) and 56 mL THF were stirred for three days at room temperature in a 100 mL round-bottom flask until no obvious solid was left. The resulting dark green stock solution was used within 24 hrs. 150 mg purified HiPco SWCNTs and 24 mL of the stock solution was stirred for 2 days at room temperature in a 50 mL round-bottom flask. The mixture was filtrated using 0.45 µm PTFE membranes yielding a black solid SWCNT polyelectrolyte, which was rinsed 3 times with distilled THF. The solid was dried overnight under vacuum at room temperature. All this procedure was performed inside a glovebox under a dry nitrogen atmosphere.

Example 3

Dispersion of SWCNT Polyelectrolytes 10-30 mg dry SWCNTs polyelectrolyte and a calculated volume of DMSO (according to the initial concentration desired) were sealed in 8 mL glass vials (under nitrogen). The solution was stirred for 14 hours and centrifuged under 9,900 g for 45 mins to separate the SWCNT polyelectrolyte solution from undissolved SWCNTs. The supernatant solution was retained for analysis. The same procedure was also performed with DMSO containing 18-crown-6.

Example 4

Determination of the Solubility of SWCNT Polyelectrolytes

The UV-Vis absorption at 500 nm was measured to obtain the concentration of the SWCNT polyelectroctrolytes in solution using a proportionability constant. The proportionability constant was calculated from the slope of a curve of UV-Vis absorption at 500 nm vs SWCNT polyelectrolyte concentration. For the exact SWCNT polyelectrolyte concentration, 1 mL of different concentrations of SWCNT polyelectrolyte solutions were added to a pre-weighed 8 mL vials and dried under vacuum at 100° for one day to remove the solvents. Then, the vial with the residue was weighted and the concentration determined. The proportionality constant was $3.23 \times 10^{-3}$ ppm$^{-1}$ mm$^{-1}$ (0.323 mL/mg mm$^{-1}$), and was used to calculate the concentration of SWCNT polyelectrolyte solutions. These solutions were typically diluted 100 times before obtaining the UV-Vis spectra.

Example 5

Probing the Solubility of SWCNT Polyelectrolytes

Figure 2:
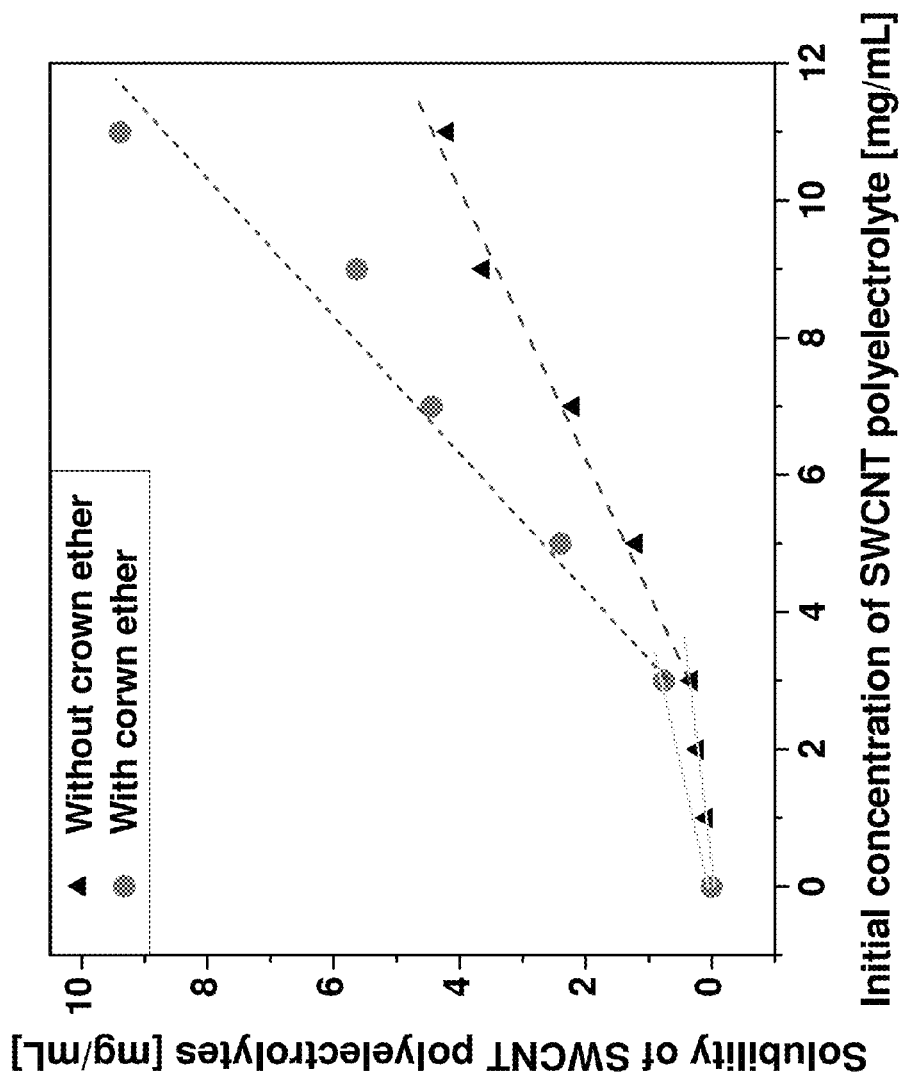
FIG. 2 shows concentration of HiPco SWCNT polyelectrolytes in DMSO solutions at different initial concentrations of SWCNT polyelectrolyte. The black triangles and red circles represent SWCNTs without and with crown ether respectively. Each curve exhibits a change in slope at ca. 3 mg/mL initial concentration; solid and dashed lines indicate best linear fits to the data above and below this concentration.

Different initial amounts of the SWCNT polyelectrolyte solids were added to DMSO inside a nitrogen-purged glovebox, stirred overnight and centrifuged. The supernatant layers were collected and the SWCNT polyelectrolytes solubilities determined from the UV-Vis absorption intensity at 500 nm using a proportionality constant (0.323 mL/mg mm$^{-1}$). FIG. 2 shows the concentration of the resulting SWCNT polyelectrolytes in DMSO solution as a function of the initial concentration of material in the mixture. The solubility of the SWCNT polyelectrolytes was found to be dependent on the initial amount of nanotubes in DMSO, with two distinct observable regions in the graph. In the first region, the concentration of polyelectrolyte increases linearly up to an initial concentration near 3 mg/mL. This linear increase reveals a constant 10.6% mass percent conversion, similar to the mass percent conversion of up to 9.4% observed by Smalley group in SWCNTs dispersions with surfactants.

The second region can be observed when the initial concentration is increased above 3 mg/mL. In this region, the concentration of SWCNT polyelectrolytes seems also to increase linearly with the initial concentration, but with a larger slope, which represent a mass percent conversion of 52%. These two distinct regions in FIG. 2 are consistent with the transition from a situation where SWCNTs are oriented randomly in solution (isotropic phase), to a situation where the isotropic phase is in equilibrium with a nematic liquid crystalline phase (biphasic region). The larger mass percent conversion of SWCNTs polyelectrolytes at higher initial concentrations is likely due to the better packing of SWCNTs in the liquid crystalline phase.

Counterion condensation onto the walls of negatively charged SWCNTs has been identified as one of the reasons for the limited solubility of SWCNT polyelectrolytes. On the other hand, crown ethers have been extensively studied due to their ability to coordinate alkali metal cations, shielding their charge from the solvent and their counterions, and increasing the distance between the ion pairs. For example, crown ethers have been used to aid in the dissolution of alkali metal salts in organic solvents, by trapping the metal cation and impeding its association with the counterion. Inspired by these results, the effect of crown ethers on the solubility of SWCNTs polyelectrolytes was examined. Specifically, 18-crown-6 was used given its high affinity for potassium cations. FIG. 2 (red circles) show also a composed linear increase in solubility in DMSO of SWCNT polyelectrolytes in the presence of the crown ether 18-crown-6. The solubility of a 5 mg/mL SWCNT polyelectrolyte solution was studied as a function of 18-crown-6 concentration, and showed that maximum solubility is attained when the concentration of crown ether is ca. 20 mg/mL. Concentrations of SWCNTs polyelectrolytes up to 9.4 mg/mL (initial concentration of SWCNTs 11 mg/mL) were obtained in the presence of 18-crown-6, which surpass all previous reported solubilities for SWCNT polyelectrolytes (0.4 mg/g in DMSO for HiPco SWCNT polyelectrolyte and 4.3 mg/mL in DMSO for Arc SWCNT polyelectrolyte).

The highest reported solubility reported from earlier studies is 4.3 mg/mL. In the present disclosure, the addition of 18-crown-6 to the mixture sequesters the potassium cations, preventing the condensation of the counterions on the nanotube side wall and increasing the charge-charge repulsion among nanotubes, which consequently increases the amount of SWCNT polyelectrolyte in solution up to 120%. For concentrations larger than 9.4 mg/mL a gel was formed, even when the solution is kept under a blanket of dry nitrogen, which made difficult the precise determination of their solubility by the method described above.

Example 6

Characterization of the SWCNT Polyelectrolytes Dispersion in DMSO

Figure 3B:
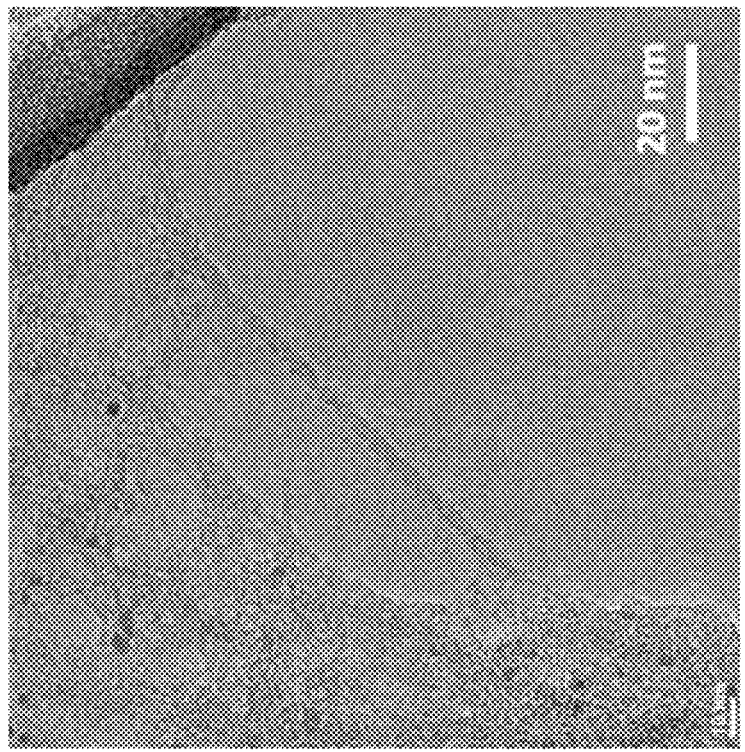
FIGS. 3A-3B show AFM image of a 0.26 mg/mL in DMSO HiPco SWCNTs polyelectrolytes solution deposited on fused silica (FIG. 3A). TEM images of HiPco SWCNTs polyelectrolytes; Formvar grid can be seen in the upper right corner (FIG. 3B).
Figure 3A:
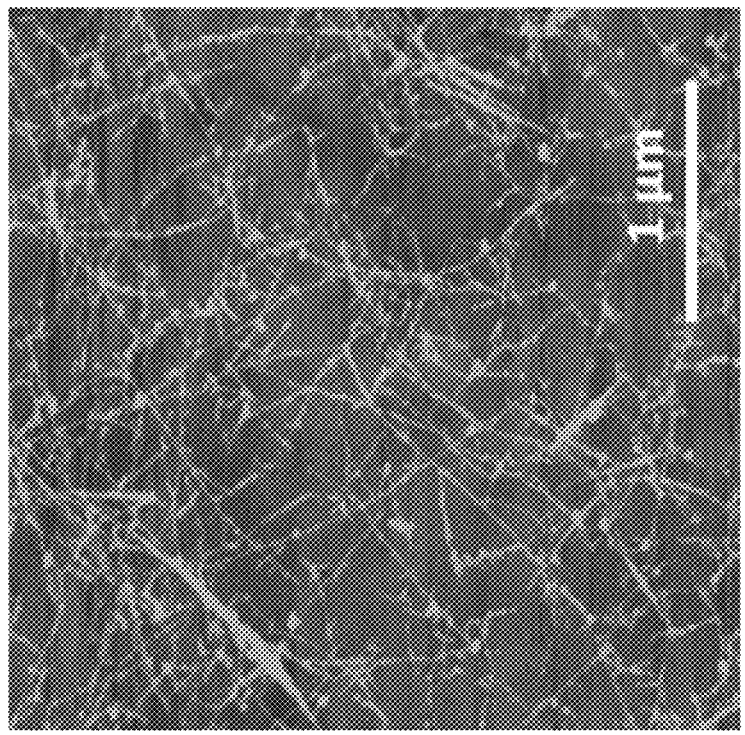

FIG. 3A shows an atomic force microscopic (AFM) image of a HiPco SWCNTs polyelectrolyte dispersion. This dispersion was diluted ten times from a 2.6 mg/mL solution in DMSO, dip coated on a quartz slide and dried in vacuum in 100° C. for 1 h. The figure shows a homogeneous dispersion of SWCNTs, where most are isolated or in small bundles. Likewise, the TEM image in FIG. 3B shows a small SWCNT bundles (ca. 5-6 nm), which is likely a consequence of the sample preparation for the microscopy experiment. Samples prepared for microscopy are unavoidably exposed to air and moisture when they are being transferred to the microscope, which causes partial aggregation of the SWCNTs.

Because relatively high concentrations of individually dispersed SWCNTs in DMSO can be dissolved, Applicants investigated evidence of liquid crystalline behavior. Polarized microscope optical images display the birefringence associated with the formation of liquid crystalline phases when the concentration of SWCNT polyelectrolytes exceeds 3.8 mg/mL (FIGS. 4A and 4B). The birefringence can be observed as a change in the image brightness when the sample is rotated relative to the polarizers. Samples with low SWCNTs concentrations do not show birefringence under cross-polarizers. To the best of our knowledge, this is the first report of a liquid crystal phase from SWCNT polyelectrolytes. While the region encompassed by the dashed lines in FIG. 2 suggests that liquid crystalline behavior could be observed at lower concentration of SWCNTs, we weren't able to observe birefringence in samples with concentrations of 2.3 mg/mL. It is probable that the small amount of liquid crystalline phase expected at these low concentrations makes it difficult to find in the cross polarized microscopy experiment.

The polarized microscopy optical images in FIGS. 4C and 4D indicate that the addition of 18-crown-6 does not prevent the formation of the liquid crystalline phase, although the brightness of FIGS. 4C and 4D is diminished due to the higher light absorption, produced by the higher concentration of SWCNTs due to the presence of crown ether. FIGS. 4C and 4D shows birefringence (changes in brightness when the stage is rotated), consistent with a liquid crystalline phase. This demonstrates that the presence of crown ethers in the SWCNT polyelectrolyte dispersions increases the solubility of SWCNTs without compromising the formation of the liquid crystalline phase.

Example 7

Diameter-Dependent Selectivity for SWCNT Polyelectrolyte Dispersions

Figures 5A, 5B:
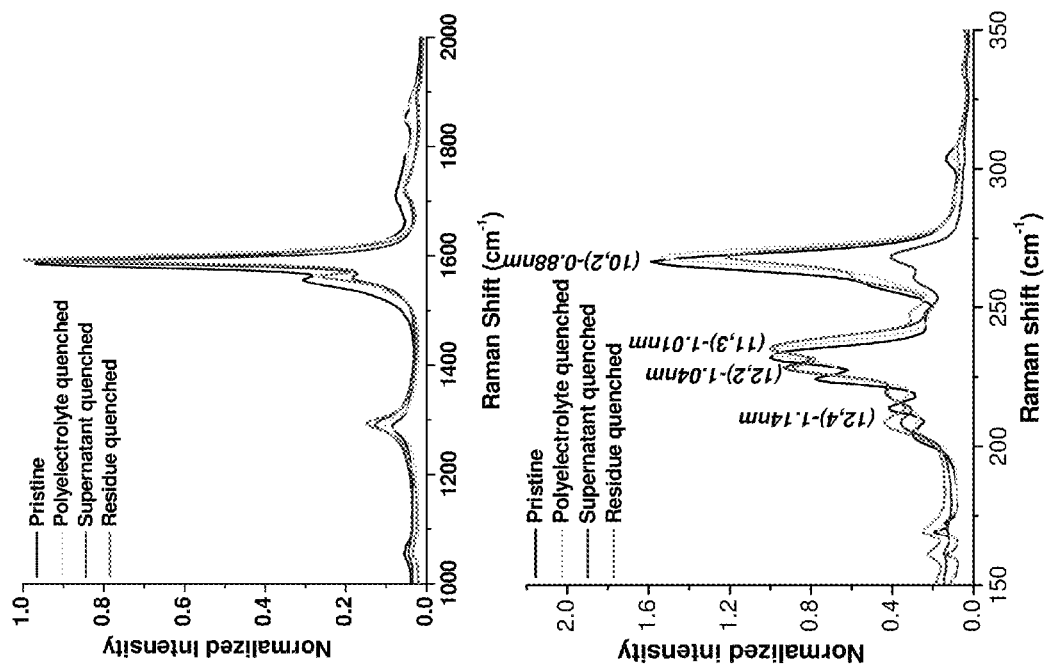
FIGS. 5A-5B show Raman spectra of pristine SWCNT, and methanol-treated (quenched) SWCNT polyelectrolytes solid salt, supernatant solution and residue (FIG. 5A). Raman spectra of the RBM region of the same samples (FIG. 5B). All spectra were obtained at 785 nm excitation.

To better understand the SWCNT polyelectrolyte solutions, Applicants used methanol to remove the electrons (quench) from the SWCNT polyelectrolytes in the supernatant and the residue after dispersion in DMSO. The quenched materials were characterized using Raman and NIR-photoluminescence spectroscopy. FIG. 5A shows the Raman spectra of the G and D peaks region of different SWCNT preparations. Methanol quenched Pristine SWCNTs and SWCNT polyelectrolyte solid salts show similar features, with a small increase in the D band for the SWCNT quenched polyelectrolyte solid. This increase in the D band can be attributed to hydrogenation of the sp2 carbons in the walls of SWCNT as described by Pekker et al. This hydrogenation is nonetheless mild and non-dependent on the type of carbon nanotube or their diameter. The quenched SWCNT polyelectrolytes in contact with DMSO showed a larger increase in D band (FIG. 5A blue and red curves). Additionally, a larger D peak was observed for the residue than the supernatant, which implies a higher degree of functionalization for the former. When SWCNT polyelectrolytes are mixed with DMSO, two phases are formed: a supernatant phase where SWCNT polyelectrolyte are dissolved, and a solid phase of SWCNT polyelectrolyte precipitate that didn't go into solution.

The Raman spectra of the radial breathing mode (RBM) region for different SWCNT polyelectrolyte materials are shown in FIG. 5B (the peaks corresponding to various types of SWCNTs were assigned according to previous literature. When the spectra are normalized, it is appreciated that the pristine and quenched SWCNT polyelectrolytes solid spectra are very similar, which is consistent with previous studies of SWCNT polyelectrolytes. However, for the supernatant and residue, it is noticed that the RBM peaks of small diameter SWCNTs particularly the (10.2) decrease dramatically. A potential explanation is that when SWCNT polyelectrolytes are mixed with DMSO, functionalization happens preferentially to the smaller diameter SWCNT. Previous studies on the covalent functionalization of SWCNT polyelectrolytes in DMSO are fully consistent with observations herein, however, they did not mentioned the selectivity towards small diameter SWCNTs. Nonetheless, it has been reported that alkylation of SWCNTs diameter-selective. In SWCNT polyelectrolytes covalently functionalized using alkyl halides, the spectral peaks corresponding to the smaller diameter SWCNTs vanished. This was attributed by the authors to the preferential functionalization of small-diameter SWCNTs. In the present disclosure, the decrease of the Raman RBM peaks of smaller-diameter SWCNTs is consistent to higher functionalization of these types of nanotubes. This can be explained in terms of the curvature of the SWCNTs, which is more pronounced (and therefore more reactive) for SWCNTs with smaller diameter.

The reader is warned that conclusions based on the intensity of the (10.2) need to be interpreted with caution since it is known that the intensity of this Raman transition can be influenced by the SWCNT aggregation state. This band, which is sometimes referred as the "roping peak", has been connected to the degree of aggregation of SWCNTs. Thus, a decrease in intensity of the (10.2) band could also be due to a lower degree of entanglement in the SWCNTs sample. To clarify this point, below we describe the photoluminescence spectroscopy experiments of SWCNT polyelectrolytes, which provide conclusive evidence for the selective functionalization of SWCNTs.

Figure 6:
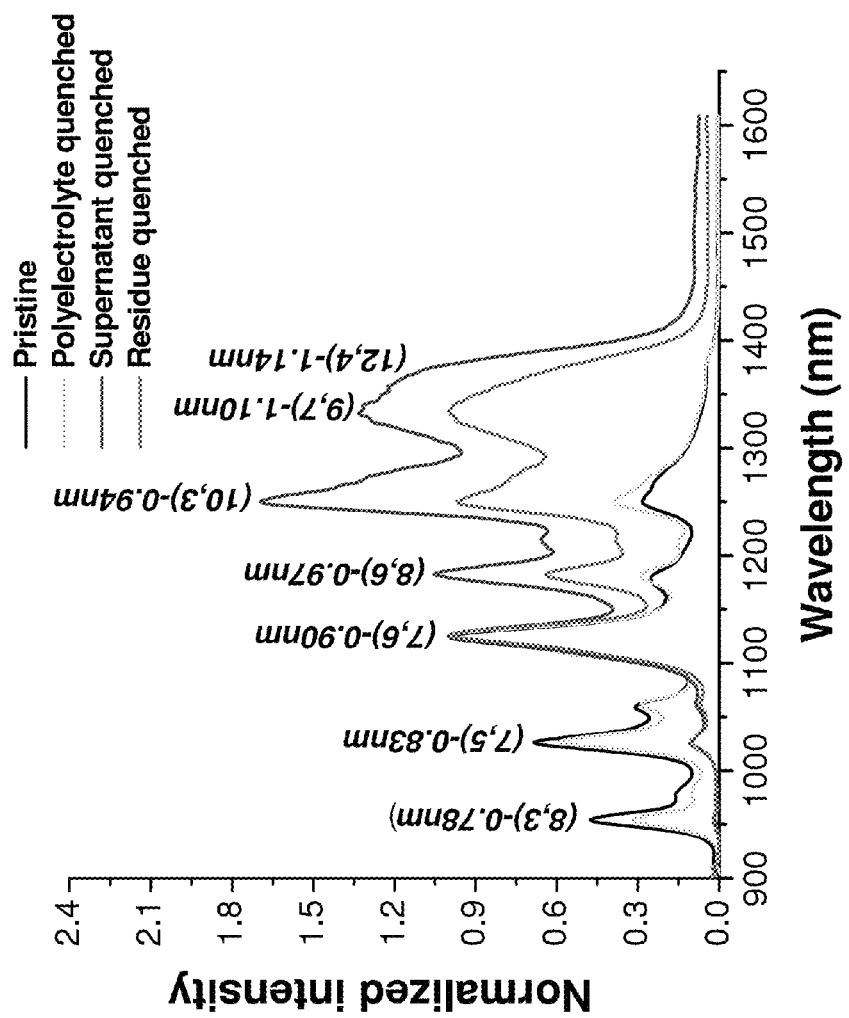
FIG. 6 shows the photoluminescence spectra (642 nm excitation) of pristine SWCNTs, and methanol-treated SWCNT polyelectrolytes solid, SWCNTs supernatant in DMSO and residue, followed by re-dispersion in SDBS aqueous solution.

Photoluminescence spectroscopy was used also to assess the degree of SWCNT functionalization. Semiconducting SWCNTs display photoluminescence emission with energies corresponding to their band gap. Methanol quenched SWCNT polyelectrolytes were re-dispersed in aqueous solution using 1% SDBS. The NIR photoluminescence spectra of SWCNT polyelectrolytes for purified SWCNTs and for the methanol-quenched SWCNT polyelectrolyte solid are very similar (FIG. 6), which is in agreement with the Raman studies. Additionally, it was seen that the photoluminescence of smaller-diameter SWCNTs is greatly reduced in the supernatant and the residue of quenched SWCNT polyelectrolytes in DMSO, which is consistent with the selective functionalization of nanotubes with small diameters.

Example 8

In a typical experiment, 10 mL of a 8% (m/V) 18-crown-6 solution in DMSO was mixed with 400 mg HiPco SWCNT polyelectrolytes (made as described above) to give an initial concentration 40 mg/mL. The mixture was sealed in a dry glass vial and stirred 1000 rpm for 1 hour, after which the mixture was placed in a speed mixer at 2350 rpm. Undispersed SWCNT aggregates were removed by filtration through a 20 μm mesh. The resulting dispersions showed birefringence under cross-polarized optical microscope, which indicates liquid crystalline behavior (FIGS. 7A-7B). SWCNTs pre-aligned in liquid crystal phases can be capitalized for making SWCNT fibers. Pre-oriented SWCNTs facilitate the process of obtaining fibers with well-aligned SWCNTs, when injected through a narrow needle into a coagulation solution. The final concentrations of the dispersions were determined by UV-Vis spectroscopy as explained above. UV-Vis experiments indicated that about 80% of the initial amount of SWCNT polyelectrolytes remained dispersed after filtration, which demonstrates that this method is effective to obtain concentrated SWCNT polyelectrolyte dispersions.

Example 9

Different concentrations of SWCNT polyelectrolyte dispersions were injected into aqueous solutions (water, aqueous hydrochloric acid and iodide solutions) through a 125 μm size spinneret to generate SWCNT fibers. The flow through the spinneret produces shear that aids aligning the liquid crystal domains along the direction of the flow during the injection. When the partially oriented SWCNT polyelectrolyte solution enters in contact with the aqueous solution (coagulant), the extra electrons are removed from the surface of the SWCNTs reducing the electrostatic repulsion, and causing their collapse into a dense fiber due to van der Waals interactions. The resulting SWCNT fibers were collected on a rotating Teflon drum, immersed in overnight in water, and subsequently dried at 100° C. for 24 hrs.

Figure 9:
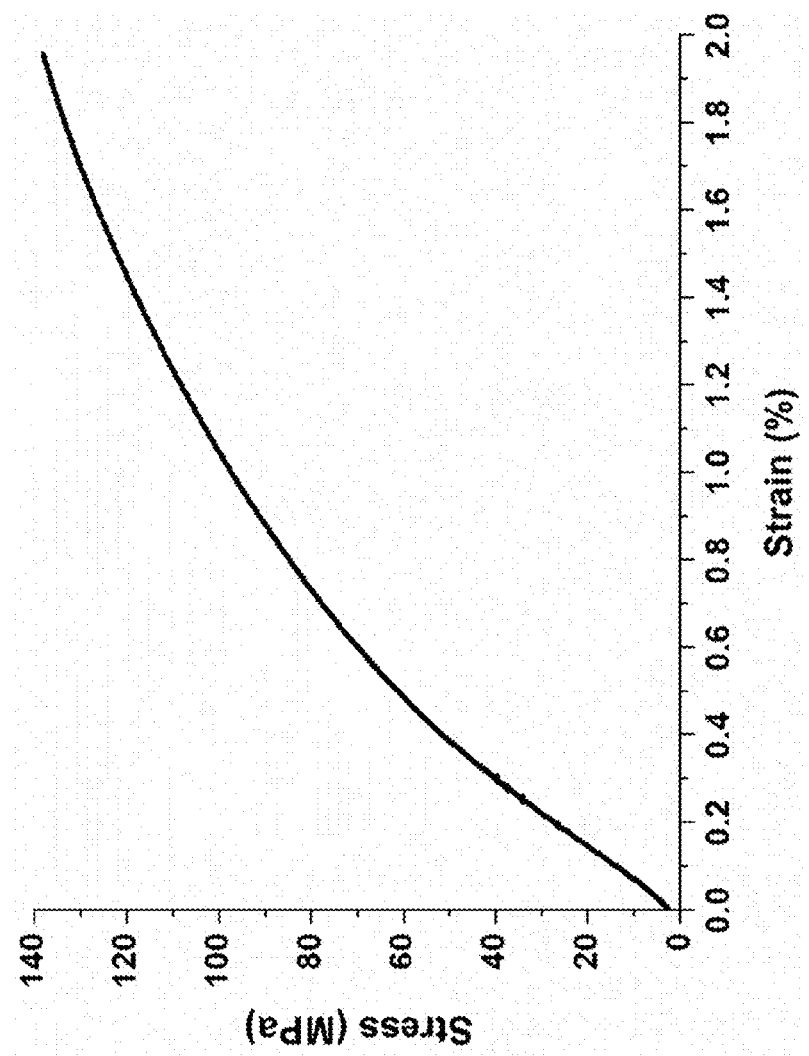
FIG. 9 shows a typical mechanical test of SWCNT fibers (35 mg/mL SWCNT polyelectrolyte dispersion spun into water). The test was performed at a preload of 0.004N and a strain rate of 0.1%/min.

The characterization of the fibers was performed by using different techniques. The morphology of the fibers was studied by scanning electron microscopy (SEM) (FIGS. 8A-8E). The fiber diameters ranged from 20 μm to 35 μm and depend of the concentration of SWCNT polyelectrolytes in solution. Large-scale alignment of SWCNT along the fibers' axis is qualitatively observed in the SEM images in FIG. 8, which is expected to lead to robust mechanical properties. Nonetheless, the fibers do not display the same level of fine-scale alignment as those spun from acid solutions. A dynamic mechanical analysis system (TA Instruments model Q800) in a static testing mode and with the assistance of a 20 mm long paper frame was used to assess the mechanical properties of the fiber. FIG. 9 shows the result for a typical experiment. Tensile strength of up to 124 MPa and Young's modulus of 14 GPa were obtained for SWCNT polyelectrolyte solutions of 35 mg/mL. This tensile strength is much better than the surfactant-based method (65 MPa) and comparable to typical results from acid-based methods (116 MPa for fuming sulfuric acid and 50-150 MPa for chlorosulfonic acid).

In addition to the mechanical properties, the effect of different coagulation solutions on the conductivity of SWCNT fibers was also studied. The best results were obtained for fibers spun from 1 mM $NaI_3$ aqueous solution, which showed electrical conductivities up to $2.1 \pm 0.2 \times 10^4$ S/m. This result is still one order of magnitude lower than the best HiPco fibers spun from superacids, but still much higher than most surfactant-based fibers. The results are summarized in Table 1. The resulting fibers maintain similar mechanical properties however fibers formed in 1 mM $NaI_3$ aqueous solution achieved better conductivities than fibers from water or HCl solutions. Energy dispersive X-ray analysis (EDAX) studied showed the presence of iodine in the fiber, which indicates that the fiber got doped with this halogen during its formation. The results in Table 1 indicate that a concentration around 35 mg/mL is optimal to achieve the best fiber properties.

Without further elaboration, it is believed that one skilled in the art can, using the description herein, utilize the present invention to its fullest extent. The embodiments described herein are to be construed as illustrative and not as constraining the remainder of the disclosure in any way whatsoever. While the preferred embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

TABLE 1

Properties of fibers obtained from HiPco SWCNT polyelectrolites under different conditions*

| Initial concentration<br>Final concentration | 20 mg/mL HiPco SWCNT polyelectrolytes in DMSO (40 mg/mL 18-crown-6)<br>16 mg/mL | | | 40 mg/mL HiPco SWCNT polyelectrolytes in DMSO (80 mg/mL 18-crown-6)<br>35 mg/mL | | | 60 mg/mL HiPco SWCNT polyelectrolytes in DMSO (80 mg/mL 18-crown-6)<br>52 mg/mL | | |
|---|---|---|---|---|---|---|---|---|---|
| Coagulation solution | water | 0.1M HCl | 1 mM $NaI_3$ | water | 0.1M HCl | 1 mM $NaI_3$ | water | 0.1M HCl | 1 mM $NaI_3$ |
| Diameter, μm | 25(5) | 22(2) | 22(5) | 32(1) | 31(6) | 32(6) | 25(2) | 24(5) | 22(1) |
| Tensile strength, Mpa | 56(8) | 71(13) | 68(16) | 124(9) | 92(5) | 100(3) | 45(5) | 42(7) | 70(4) |
| Young's Modulus, Gpa | 8(3) | 14(2) | 14(2) | 14(2) | 13(2) | 15(1) | 7.3(0.4) | 7(1) | 9.0(0.7) |
| Elongation, % | 1.1(0.5) | 0.4(0.1) | 0.4(0.2) | 1.9(0.2) | 1.0(0.2) | 0.9(0.1) | 0.43(0.08) | 0.5(0.2) | 0.9(0.3) |
| Conductivity, $\times 10^4$ S/m | 1.0(0.1) | 1.6(0.2) | 1.8(0.2) | 1.3(0.2) | 1.7(0.3) | 2.1(0.2) | 0.67(0.02) | 0.91(0.04) | 1.11(0.04) |

*Numbers in parenthesis represent the uncertainty values.

REFERENCES (1) Wang, C.; Chien, J. C.; Takei, K.; Takahashi, T.; Nah, J.; Niknejad, A. M.; Javey, A. *Nano Lett.* 2012, 12, 1527.
(2) Zhao, J. W.; Gao, Y. L.; Lin, J.; Chen, Z.; Cui, Z. *J. Mater. Chem.* 2012, 22, 2051.
(3) Jo, J. W.; Jung, J. W.; Lee, J. U.; Jo, W. H. *ACS Nano* 2010, 4, 5382.
(4) Liu, W. B.; Pei, S. F.; Du, J. H.; Liu, B. L.; Gao, L. B.; Su, Y.; Liu, C.; Cheng, H. M. *Adv. Funct. Mater* 2011, 21, 2330.
(5) Saha, A.; Ghosh, S.; Weisman, R. B.; Martí, A. A. *ACS Nano* 2012, 6, 5727.
(6) Mirri, F.; Ma, A. W. K.; Hsu, T. T.; Behabtu, N.; Eichmann, S. L.; Young, C. C.; Tsentalovich, D. E.; Pasquali, M. *ACS Nano* 2012, 6, 9737.
(7) Holt, J. M.; Ferguson, A. J.; Kopidakis, N.; Larsen, B. A.; Bult, J.; Rumbles, G.; Blackburn, J. L. *Nano Lett.* 2010, 10, 4627.
(8) Ren, S. Q.; Bernardi, M.; Lunt, R. R.; Bulovic, V.; Grossman, J. C.; Gradecak, S. *Nano Lett.* 2011, 11, 5316.
(9) Ramesh, S.; Ericson, L. M.; Davis, V. A.; Saini, R. K.; Kittrell, C.; Pasquali, M.; Billups, W. E.; Adams, W. W.; Hauge, R. H.; Smalley, R. E. *J. Phys. Chem. B* 2004, 108, 8794.
(10) Chen, Z.; Kobashi, K.; Rauwald, U.; Booker, R.; Fan, H.; Hwang, W.-F.; Tour, J. M. *J. Am. Chem. Soc.* 2006, 128, 10568.
(11) Gebhardt, B.; Hof, F.; Backes, C.; Muller, M.; Plocke, T.; Maultzsch, J.; Thomsen, C.; Hauke, F.; Hirsch, A. *J. Am. Chem. Soc.* 2011, 133, 19459.
(12) Strano, M. S.; Dyke, C. A.; Usrey, M. L.; Barone, P. W.; Allen, M. J.; Shan, H.; Kittrell, C.; Hauge, R. H.; Tour, J. M.; Smalley, R. E. *Science* 2003, 301, 1519.
(13) Tuncel, D. *Nanoscale* 2011, 3, 3545.
(14) Jain, D.; Saha, A.; Marti, A. A. *Chem. Commun.* 2011, 47, 2246.
(15) Li, H.; Zhou, B.; Lin, Y.; Gu, L.; Wang, W.; Fernando, K. A. S.; Kumar, S.; Allard, L. F.; Sun, Y.-P. *J. Am. Chem. Soc.* 2004, 126, 1014.
(16) Rai, P. K.; Pinnick, R. A.; Parra-Vasquez, A. N. G.; Davis, V. A.; Schmidt, H. K.; Hauge, R. H.; Smalley, R. E.; Pasquali, M. *J. Am. Chem. Soc.* 2006, 128, 591.
(17) Davis, V. A.; Parra-Vasquez, A. N. G.; Green, M. J.; Rai, P. K.; Behabtu, N.; Prieto, V.; Booker, R. D.; Schmidt, J.; Kesselman, E.; Zhou, W.; Fan, H.; Adams, W. W.; Hauge, R. H.; Fischer, J. E.; Cohen, Y.; Talmon, Y.; Smalley, R. E.; Pasquali, M. *Nat. Nanotechnol.* 2009, 4, 830.
(18) Saha, A.; Ghosh, S.; Behabtu, N.; Pasquali, M.; Marti, A. A. *Chem. Sci.* 2011, 2, 1682.
(19) Petit, P.; Mathis, C.; Journet, C.; Bernier, P. *Chem. Phys. Lett.* 1999, 305, 370.
(20) Liang, F.; Sadana, A. K.; Peera, A.; Chattopadhyay, J.; Gu, Z. N.; Hauge, R. H.; Billups, W. E. *Nano Lett.* 2004, 4, 1257.
(21) Pénicaud, A.; Poulin, P.; Derré, A.; Anglaret, E.; Petit, P. *J. Am. Chem. Soc.* 2004, 127, 8.
(22) Voiry, D.; Roubeau, O.; Penicaud, A. *J. Mater. Chem.* 2010, 20, 4385.
(23) Voiry, D.; Drummond, C.; Penicaud, A. *Soft Matter* 2011, 7, 7998.
(24) Ko, H.; Tsukruk, V. V. *Nano Lett.* 2006, 6, 1443.
(25) Ericson, L. M.; Fan, H.; Peng, H. Q.; Davis, V. A.; Zhou, W.; Sulpizio, J.; Wang, Y. H.; Booker, R.; Vavro, J.; Guthy, C.; Parra-Vasquez, A. N. G.; Kim, M. J.; Ramesh, S.; Saini, R. K.; Kittrell, C.; Lavin, G.; Schmidt, H.; Adams, W. W.; Billups, W. E.; Pasquali, M.; Hwang, W. F.; Hauge, R. H.; Fischer, J. E.; Smalley, R. E. *Science* 2004, 305, 1447.
(26) Pénicaud, A.; Valat, L.; Derré, A.; Poulin, P.; Zakri, C.; Roubeau, O.; Maugey, M.; Miaudet, P.; Anglaret, E.; Petit, P.; Loiseau, A.; Enouz, S. *Compos. Sci. Technol.* 2007, 67, 795.
(27) Behabtu, N.; Young, C. C.; Tsentalovich, D. E.; Kleinerman, O.; Wang, X.; Ma, A. W. K.; Bengio, E. A.; ter Waarbeek, R. F.; de Jong, J. J.; Hoogerwerf, R. E.; Fairchild, S. B.; Ferguson, J. B.; Maruyama, B.; Kono, J.; Talmon, Y.; Cohen, Y.; Otto, M. J.; Pasquali, M. *Science* 2013, 339, 182.

(28) Zhang, S. J.; Kumar, S. *Small* 2008, 4, 1270.
(29) Parra-Vasquez, A. N. G.; Behabtu, N.; Green, M. J.; Pint, C. L.; Young, C. C.; Schmidt, J.; Kesselman, E.; Goyal, A.; Ajayan, P. M.; Cohen, Y.; Talmon, Y.; Hauge, R. H.; Pasquali, M. *Acs Nano* 2010, 4, 3969.
(30) Davis, V. A.; Ericson, L. M.; Parra-Vasquez, A. N. G.; Fan, H.; Wang, Y.; Prieto, V.; Longoria, J. A.; Ramesh, S.; Saini, R. K.; Kittrell, C.; Billups, W. E.; Adams, W. W.; Hauge, R. H.; Smalley, R. E.; Pasquali, M. *Macromolecules* 2003, 37, 154.
(31) Moore, V. C.; Strano, M. S.; Haroz, E. H.; Hauge, R. H.; Smalley, R. E.; Schmidt, J.; Talmon, Y. *Nano Lett.* 2003, 3, 1379.
(32) Pedersen, C. J. *J. Am. Chem. Soc.* 1970, 92, 386.
(33) Pedersen, C. J.; Frensdorff, H. K. *Angew. Chem. Int. Ed.* 1972, 11, 16.
(34) Pekker, S.; Salvetat, J. P.; Jakab, E.; Bonard, J. M.; Forró, L. *J. Phys. Chem. B* 2001, 105, 7938.
(35) Wunderlich, D.; Hauke, F.; Hirsch, A. *J. Mater. Chem.* 2008, 18, 1493.
(36) Guan, J. W.; Martinez-Rubi, Y.; Denommee, S.; Ruth, D.; Kingston, C. T.; Daroszewska, M.; Barnes, M.; Simard, B. *Nanotechnology* 2009, 20.
(37) Bachilo, S. M.; Strano, M. S.; Kittrell, C.; Hauge, R. H.; Smalley, R. E.; Weisman, R. B. *Science* 2002, 298, 2361.
(38) Araujo, P. T.; Pesce, P. B. C.; Dresselhaus, M. S.; Sato, K.; Saito, R.; Jorio, A. *Physica E* 2010, 42, 1251.
(39) Müller, M.; Maultzsch, J.; Wunderlich, D.; Hirsch, A.; Thomsen, C. *Phys. Status Solidi B* 2008, 245, 1957.
(40) Hodge, S. A.; Bayazit, M. K.; Coleman, K. S.; Shaffer, M. S. P. *Chem. Soc. Rev.* 2012, 41, 4409.
(41) Heller, D. A.; Barone, P. W.; Swanson, J. P.; Mayrhofer, R. M.; Strano, M. S. *J. Phys. Chem. B* 2004, 108, 6905.
(42) O'Connell, M. J.; Sivaram, S.; Doorn, S. K. *Phys. Rev. B: Condens. Matter* 2004, 69, 235415.
(43) Luo, Z.; Doorn, S. K.; Li, R.; Papadimitrakopoulos, F. *Phys. Status Solidi B* 2006, 243, 3155.
(44) Weisman, R. B.; Bachilo, S. M. *Nano Lett.* 2003, 3, 1235.
(45) Chiang, I. W.; Brinson, B. E.; Huang, A. Y.; Willis, P. A.; Bronikowski, M. J.; Margrave, J. L.; Smalley, R. E.; Hauge, R. H. *J. Phys. Chem. B* 2001, 105, 8297.
(46) Ericson, L. M.; Fan, H.; Peng, H.; Davis, V. A.; Zhou, W.; Sulpizio, J.; Wang, Y.; Booker, R.; Vavro, J.; Guthy, C.; Parra-Vasquez, A. N. G.; Kim, M. J.; Ramesh, S.; Saini, R. K.; Kittrell, C.; Lavin, G.; Schmidt, H.; Adams, W. W.; Billups, W. E.; Pasquali, M.; Hwang, W.-F.; Hauge, R. H.; Fischer, J. E.; Smalley, R. E. *Science* 2004, 305, 1447.
(47) Davis, V. A.; Parra-Vasquez, A. N. G.; Green, M. J.; Rai, P. K.; Behabtu, N.; Prieto, V.; Booker, R. D.; Schmidt, J.; Kesselman, E.; Zhou, W.; Fan, H.; Adams, W. W.; Hauge, R. H.; Fischer, J. E.; Cohen, Y.; Talmon, Y.; Smalley, R. E.; Pasquali, M. *Nat. Nanotechnol.* 2009, 4, 830.
(48) Ramesh, S.; Ericson, L. M.; Davis, V. A.; Saini, R. K.; Kittrell, C.; Pasquali, M.; Billups, W. E.; Adams, W. W.; Hauge, R. H.; Smalley, R. E. *J. Phys. Chem. B* 2004, 108, 8794.
(49) Rai, P. K.; Pinnick, R. A.; Parra-Vasquez, A. N. G.; Davis, V. A.; Schmidt, H. K.; Hauge, R. H.; Smalley, R. E.; Pasquali, M. *J. Am. Chem. Soc.* 2005, 128, 591.
(50) Parra-Vasquez, A. N. G.; Behabtu, N.; Green, M. J.; Pint, C. L.; Young, C. C.; Schmidt, J.; Kesselman, E.; Goyal, A.; Ajayan, P. M.; Cohen, Y.; Talmon, Y.; Hauge, R. H.; Pasquali, M. *ACS Nano* 2010, 4, 3969.
(51) Ausman, K. D.; Piner, R.; Lourie, O.; Ruoff, R. S.; Korobov, M. *J. Phys. Chem. B* 2000, 104, 8911.
(52) Bahr, J. L.; Mickelson, E. T.; Bronikowski, M. J.; Smalley, R. E.; Tour, J. M. *Chem. Commun.* 2001, 193.
(53) Giordani, S.; Bergin, S. D.; Nicolosi, V.; Lebedkin, S.; Kappes, M. M.; Blau, W. J.; Coleman, J. N. *J. Phys. Chem. B* 2006, 110, 15708.
(54) Moore, V. C.; Strano, M. S.; Haroz, E. H.; Hauge, R. H.; Smalley, R. E.; Schmidt, J.; Talmon, Y. *Nano Lett.* 2003, 3, 1379.
(55) O'Connell, M. J.; Bachilo, S. M.; Huffman, C. B.; Moore, V. C.; Strano, M. S.; Haroz, E. H.; Rialon, K. L.; Boul, P. J.; Noon, W. H.; Kittrell, C.; Ma, J.; Hauge, R. H.; Weisman, R. B.; Smalley, R. E. *Science* 2002, 297, 593.
(56) Kam, N. W. S.; Liu, Z.; Dai, H. *J. Am. Chem. Soc.* 2005, 127, 12492.
(57) Zheng, M.; Jagota, A.; Strano, M. S.; Santos, A. P.; Barone, P.; Chou, S. G.; Diner, B. A.; Dresselhaus, M. S.; Mclean, R. S.; Onoa, G. B.; Samsonidze, G. G.; Semke, E. D.; Usrey, M.; Walls, D. J. *Science* 2003, 302, 1545.
(58) Pénicaud, A.; Poulin, P.; Derré, A.; Anglaret, E.; Petit, P. *J. Am. Chem. Soc.* 2004, 127, 8.
(59) Voiry, D.; Roubeau, O.; Penicaud, A. *J. Mater. Chem.* 2010, 20, 4385.
(60) Voiry, D.; Drummond, C.; Penicaud, A. *Soft Matter* 2011, 7, 7998.
(61) Fogden, S.; Howard, C. A.; Heenan, R. K.; Skipper, N. T.; Shaffer, M. S. P. *ACS Nano* 2011, 6, 54.
(62) Hodge, S. A.; Fogden, S.; Howard, C. A.; Skipper, N. T.; Shaffer, M. S. P. *ACS Nano* 2013, 7, 1769.
(63) Liang, F.; Sadana, A. K.; Peera, A.; Chattopadhyay, J.; Gu, Z. N.; Hauge, R. H.; Billups, W. E. *Nano Lett.* 2004, 4, 1257.
(64) Chattopadhyay, J.; Sadana, A. K.; Liang, F.; Beach, J. M.; Xiao, Y.; Hauge, R. H.; Billups, W. E. *Org. Lett.* 2005, 7, 4067.
(65) Behabtu, N.; Green, M. J.; Pasquali, M. *Nano Today* 2008, 3, 24.
(66) Pénicaud, A.; Valat, L.; Derré, A.; Poulin, P.; Zakri, C.; Roubeau, O.; Maugey, M.; Miaudet, P.; Anglaret, E.; Petit, P.; Loiseau, A.; Enouz, S. *Compos. Sci. Technol.* 2007, 67, 795.
(67) Vigolo, B.; Pénicaud, A.; Coulon, C.; Sauder, C.; Pailler, R.; Journet, C.; Bernier, P.; Poulin, P. *Science* 2000, 290, 1331.
(68) Anderson, R. E.; Barron, A. R. *J. Nanosci. Nanotechnol.* 2007, 7, 3436.
(69) Gebhardt, B.; Syrgiannis, Z.; Backes, C.; Graupner, R.; Hauke, F.; Hirsch, A. *J. Am. Chem. Soc.* 2011, 133, 7985.
(70) Barisci, J. N.; Tahhan, M.; Wallace, G. G.; Badaire, S.; Vaugien, T.; Maugey, M.; Poulin, P. *Adv. Funct. Mater.* 2004, 14, 133.
(71) Kozlov, M. E.; Capps, R. C.; Sampson, W. M.; Ebron, V. H.; Ferraris, J. P.; Baughman, R. H. *Adv. Mater.* 2005, 17, 614.
(72) Jiang, C.; Saha, A.; Xiang, C.; Young, C. C.; Tour, J. M.; Pasquali, M.; Martí, A. A. *ACS Nano* 2013, 7, 4503.
(73) Behabtu, N.; Young, C. C.; Tsentalovich, D. E.; Kleinerman, O.; Wang, X.; Ma, A. W. K.; Bengio, E. A.; ter Waarbeek, R. F.; de Jong, J. J.; Hoogerwerf, R. E.; Fairchild, S. B.; Ferguson, J. B.; Maruyama, B.; Kono, J.; Talmon, Y.; Cohen, Y.; Otto, M. J.; Pasquali, M. *Science* 2013, 339, 182.
(74) Steinmetz, J.; Glerup, M.; Paillet, M.; Bernier, P.; Holzinger, M. *Carbon* 2005, 43, 2397.

What is claimed is:

1. A method of forming a solution of single-walled carbon nanotubes in a liquid crystalline phase, said method comprising:
providing single-walled carbon nanotube polyelectrolytes; and mixing the single-walled carbon nanotube polyelectrolytes with a polar aprotic solvent and a crown ether to form a mixture, wherein the crown ether facilitates the dissolution of the single-walled carbon nanotube polyelectrolytes in the polar aprotic solvent, thereby resulting in the formation of single-walled carbon nanotubes in the liquid crystalline phase.

2. The method of claim 1, wherein the polar aprotic solvent is dimethyl sulfoxide (DMSO).

3. The method of claim 1, wherein the polar aprotic solvent is sulfolane.

4. The method of claim 1, wherein the polar aprotic solvent is dimethylformamide (DMF).

5. The method of claim 1, wherein the crown ether is 18-crown-6.

6. The method of claim 1, wherein mixing occurs at around 2500 rpm.

7. The method of claim 1, wherein the concentration of the single-walled carbon nanotubes in solution is up to about 52 mg/ml.

8. The method of claim 1, wherein the step of providing the single-walled carbon nanotube polyelectrolytes comprises:
contacting single-walled carbon nanotubes with a solution comprising:
an alkali metal,
at least one polyaromatic compound, and
an aprotic solvent;
stirring the resultant solution;
filtering the solution to obtain the single-walled carbon nanotube polyelectrolyte;
rinsing the single-walled carbon nanotube polyelectrolyte with the aprotic solvent; and
drying the single-walled carbon nanotube polyelectrolyte.

9. The method of claim 8, wherein the alkali metal is selected from the group consisting of potassium, lithium, sodium, and combinations thereof.

10. The method of claim 8, wherein at least one polyaromatic compound is selected from the group consisting of naphthalene, anthracene, phenanthracene, pyrene, tetracene, tetraphene, chrysene, triphenylene, pentacene, pentaphene, perylene, benzo[a]pyrene, coronene, antanthrene, corannulene, ovalene, graphene, fullerene, cycloparaphenylene, polyparaphenylene, cyclophene, and combinations thereof.

11. The method of claim 8, wherein the aprotic solvent is selected from the group consisting of tetrahydrofuran, dimethoxyelthane, and combinations thereof.

12. A method of making single-walled carbon nanotube fibers, said method comprising:
providing single-walled carbon nanotube polyelectrolytes;
mixing the single-walled carbon nanotube polyelectrolytes with a polar aprotic solvent and a crown ether to form a mixture, wherein the crown ether facilitates the dissolution of the single-walled carbon nanotube polyelectrolytes in the polar aprotic solvent, thereby resulting in formation of single-walled carbon nanotubes in liquid crystalline phase; and
coagulating the mixture to form the single-walled carbon nanotube fibers.

13. The method of claim 12, wherein the polar aprotic solvent is dimethyl sulfoxide (DMSO).

14. The method of claim 12, wherein the polar aprotic solvent is sulfolane.

15. The method of claim 12, wherein the polar aprotic solvent is dimethylformamide (DMF).

16. The method of claim 12, wherein the crown ether is 18-crown-6.

17. The method of claim 12, wherein the mixing occurs at around 2500 rpm.

18. The method of claim 12, wherein the concentration of the single-walled carbon nanotubes in solution is up to about 52 mg/ml.

19. The method of claim 12, wherein the coagulating comprises extruding the mixture.

20. The method of claim 12, wherein the coagulating comprises extruding the mixture into a coagulation solution.

21. The method of claim 20, wherein the coagulation solution is selected from the group consisting of water, aqueous hydrochloric acid, iodide solutions, and combinations thereof.

22. The method of claim 12, wherein the single-walled carbon nanotube fibers have a diameter ranging from about 20 $\mu M$ to about 35 $\mu M$.

23. The method of claim 12, wherein the single-walled carbon nanotube fibers have a tensile strength of about 124 Mpa, and a Young's modulus of about 14 Gpa.

24. A method of making a single-walled carbon nanotube composite, said method comprising:
providing single-walled carbon nanotube polyelectrolytes;
mixing the single-walled carbon nanotube polyelectrolytes with a polar aprotic solvent and a crown ether to form a mixture, wherein the crown ether facilitates the dissolution of the single-walled carbon nanotube polyelectrolytes in the polar aprotic solvent, thereby resulting in formation of single-walled carbon nanotubes in liquid crystalline phase; and
dispersing the mixture onto a surface to form the single-walled carbon nanotube composites.

25. The method of claim 24, wherein the polar aprotic solvent is dimethyl sulfoxide (DMSO).

26. The method of claim 24, wherein the polar aprotic solvent is sulfolane.

27. The method of claim 24, wherein the polar aprotic solvent is dimethylformamide (DMF).

28. The method of claim 24, wherein the crown ether is 18-crown-6.

29. The method of claim 24, wherein the mixing occurs at around 2500 rpm.

30. The method of claim 24, wherein the concentration of the single-walled carbon nanotubes in the solution is up to about 52 mg/ml.

31. The method of claim 24, wherein the single-walled nanotube composite is in the form of a film.

32. The method of claim 24, wherein the method further comprises mixing the single-walled carbon nanotube polyelectrolytes in liquid crystalline phase with a polymer precursor.

33. The method of claim 32, wherein the polymer precursor is a monomer selected from the group consisting of ethyl acrylate, methyl metacrylate, acrylonitrile, N-vinylpyrrolidone, and combinations thereof.

34. An article comprising neat aligned single-walled carbon nanotube polyelectrolytes in liquid crystalline phase, wherein the article is produced by a process comprising:
providing single-walled carbon nanotube polyelectrolytes;
mixing the single-walled carbon nanotube polyelectrolytes with a polar aprotic solvent and a crown ether to form a mixture, wherein the crown ether facilitates the dissolution of the single-walled carbon nanotube polyelectrolytes in the polar aprotic solvent, thereby resulting in formation of single-walled carbon nanotubes in liquid crystalline phase; and
dispersing the mixture onto a surface to form the article.

35. The article of claim 34, wherein the polar aprotic solvent is dimethyl sulfoxide (DMSO).

36. The article of claim 34, wherein the polar aprotic solvent is sulfolane.

37. The article of claim 34, wherein the polar aprotic solvent is dimethylformamide (DMF).

38. The article of claim 34, wherein the crown ether is 18-crown-6.

39. The article of claim 34, wherein the mixing occurs at around 2500 rpm.

40. The article of claim 34, wherein the concentration of the single-walled carbon nanotubes in solution is up to about 52 mg/ml.

41. The article of claim 34, wherein the process further comprises mixing the single-walled carbon nanotube polyelectrolytes in liquid crystalline phase with a polymer precursor.

42. The article of claim 41, wherein the polymer precursor is selected from the group consisting of polyvinyl alcohol, polyethylene glycol, polyacrylonitrile, and combinations thereof.

43. The article of claim 34, wherein the article is in the form of a film.

44. The method of claim 12, wherein the single-walled carbon nanotube fibers have a tensile strength of at least about 100 Mpa.

45. The method of claim 12, wherein the single-walled carbon nanotube fibers have a Young's modulus of at least about 13 Gpa.

\* \* \* \* \*